Oct. 20, 1964 R. K. POTTLE 3,153,506
CONTAINER
Filed Oct. 25, 1962 2 Sheets-Sheet 1
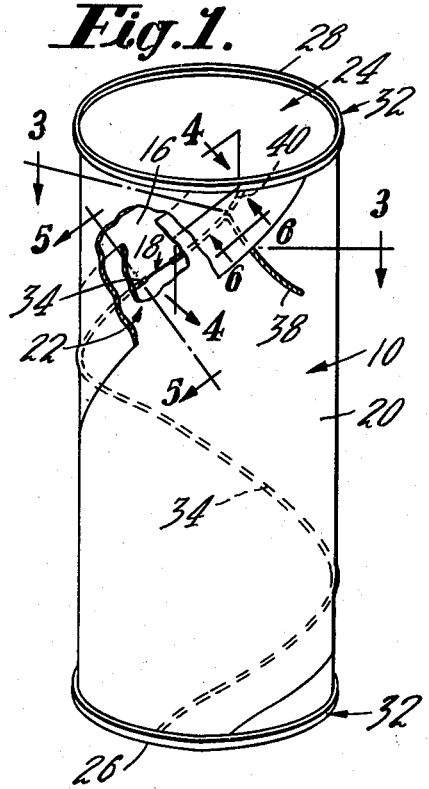
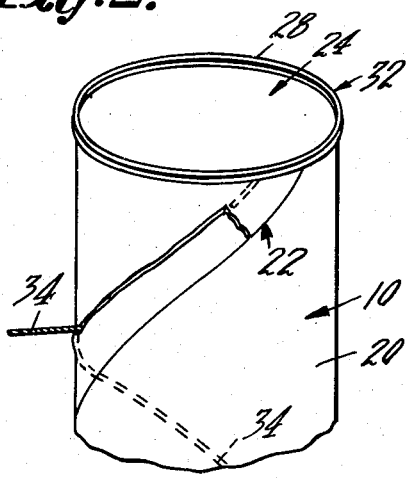
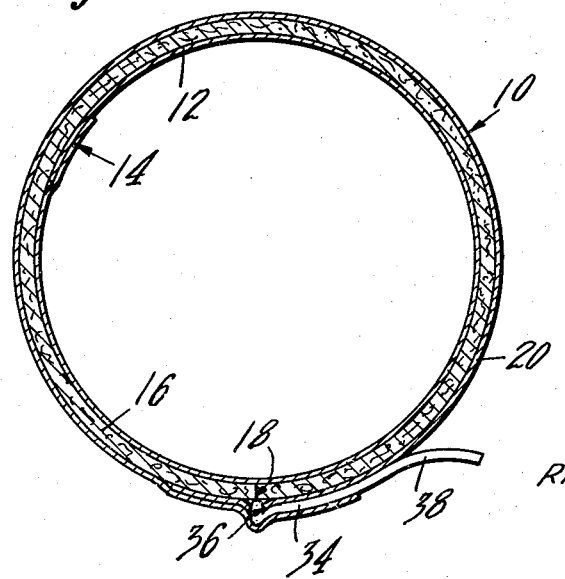
INVENTOR.
RALPH KENNICOTT POTTLE
BY
AGENT

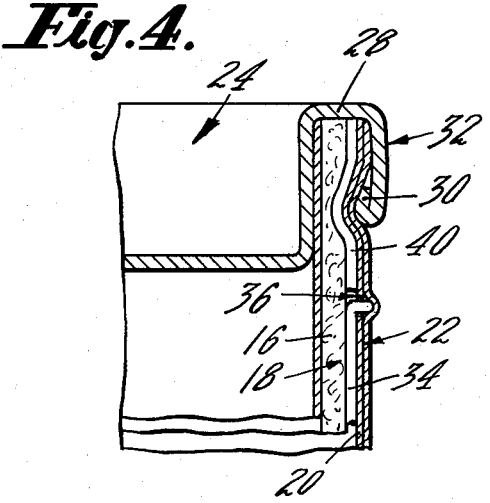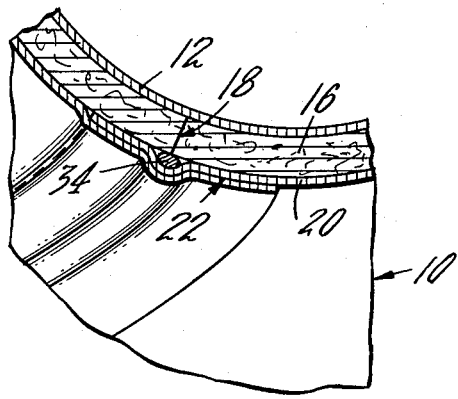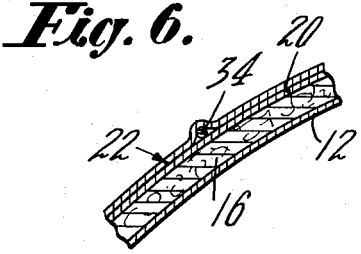

3,153,506
CONTAINER
Ralph Kennicott Pottle, Georgetown, Conn., assignor to American Can Company, New York, N.Y., a corporation of New Jersey
Filed Oct. 25, 1962, Ser. No. 232,989
10 Claims. (Cl. 229—51)

The present invention relates to spirally wound, fibre tear string containers, and more particularly to such a container that is useful for holding unbaked biscuit dough or a similar product.

In the commercial packaging and handling of raw biscuit dough, the container must meet certain specifications to successfully hold the product. It must be strong enough to withstand the internal pressure generated by the leavening action of the baking powder during the proofing and handling periods. Secondly, the external surfaces of the container must be moisture and water proof in order to prevent softening of the container body by the condensation of atmospheric moisture on the chilled container surfaces during refrigerated storage of the filled container. Similarly, the internal surfaces of the container must also be moisture and water proof, since the dough itself contains a considerable amount of water which must be kept from reaching the inner body ply. In addition, the container should be easily openable without deformation of the contents or requiring the use of opening tools, to be attractive to the ultimate consumer.

Containers of various types and constructions have been used to package biscuit dough with varying degrees of success. Some have not been strong enough to consistently withstand the internal pressures, while others have been so strong as to be difficult to open. In other types, the biscuits have been put in a separate liner bag, which has entailed unnecessary expense, and still others have utilized a waterproof external label with cuts in it to provide an opening feature, thereby making the container susceptible to external moisture. The general purpose of the instant invention, therefore, is to provide a container which meets all of the above mentioned specifications and possesses none of the aforedescribed disadvantages.

An object of the present invention is the provision of a spirally wound container for biscuit dough or other pressurizing or non-pressurizing products which can be easily opened by a tear string.

Another object is the provision of a container having a body comprising a comparatively heavy spirally wound body ply, and having a tear string disposed over the spiral butt joint of the body ply so that when it is pulled and the ends of the container are thereafter twisted in opposite directions, the body can be laid out flat to completely release the plastic contents without substantial deformation.

A further object is to provide a container having a spirally wound main body ply and an external label ply, wherein the label ply has the spiral edges thereof lapped and adhesively secured together to form a wide lap joint which is located over the spiral butt joint of the main body ply, thereby reinforcing the container in the area overlying the butt joint.

A still further object is the provision of such a container having a spiral tear string located between the butt joint of the main body ply and the lap joint of the external label ply in such manner than upon tearing, the string will tear through the underlap and overlap of the label to so weaken the container that it will either open spontaneously under the pressure of its contents, or can easily be twisted open if a non-pressurized product is packed.

Yet another object is the provision of a spirally wound tear string container having an external label ply, wherein the spiral tear string is located under the lap joint of the label ply and has a portion thereof extending between the label overlap to the outside of the container, where it is visible to the consumer and can be grasped and pulled to open the container.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a container constructed according to the principles of the present invention, parts being broken away;

FIG. 2 is a view of the upper portion of the container shown in FIG. 1, showing the initial stage of the opening action of the tear string, parts being broken away;

FIG. 3 is an enlarged sectional view taken substantially along the line 3—3 in FIG. 1;

FIGS. 4, 5 and 6 are enlarged sectional views taken substantially along the lines 4—4, 5—5, and 6—6, respectively, in FIG. 1.

As a preferred or exemplary embodiment of the invention, the drawings illustrate a container having a body 10 preferably formed of three plies helically or spirally wound in the same direction and at the same angle and glued together to form a strong moisture and water proof body. These plies, reading from the inside out, comprise first, an inner liner 12, preferably composed of thin aluminum foil prelaminated to a supporting paper backing, and having its edges overlapped to form a helical lap joint 14 to prevent the leakage therethrough of gases, grease or moisture. The liner 12 is glued to a main body ply 16, preferably formed of comparatively heavy stock such as chipboard or kraft, and having its edges butted to form a helical butt joint 18, which is circumferentially offset from the lap joint 14 of the liner 12. The main body ply 16 in turn is adhesively secured to an outer label ply 20, the spiral edges of which are lapped to form a wide helical lap joint 22 which is located over the butt joint 18 of the main body ply 16, as will be hereinafter more fully explained. The label 20 is preferably made of a thin layer aluminum foil which is prelaminated to a strengthening paper backing, and the bond between the inner label surface and the main body ply can be produced either by a suitable hot melt adhesive or by a conventional glue such as dextrine. A desired label design (not shown) may be printed directly on the external foil surface of the label 20. It will be understood that the label ply 20 is not limited to a lamination of aluminum foil and paper backing, but may comprise any suitable material, such as a single layer of heavy aluminum foil, or a lamination of any two or more materials which in combination meet the requirements of a given package.

As best seen in FIGS. 1 and 4, the ends of the container are preferably closed by upper and lower metal end members 24, 26 formed with U-shaped peripheral channels 28 which receive the ends of the body 10. The outer flanges of the channels 28 are provided with hemmed edges 30 and are clamped against the body ends to compress the same and form tight end seams 32 which are resistant to the axial pressure developed within the container by the biscuit dough or similar product contained therein. The liner ply 12 and the label ply 20 extend fully into the end seam 32, thereby isolating the raw cut edges of the main body ply 16 from any moisture which might be present either internally or externally of the container. Thus, a strong rigid container is provided which is unaffected by the moisture normally encountered during commercial handling and storage conditions.

It should be noted that the strength of the container would be greatly lessened if moisture in any appreciable amount were permitted to reach the main body ply 16, since it would rapidly soften and weaken, with the result that the container would be unable to withstand the considerable internal pressures which are developed.

In order to provide a means for opening the container without the necessity of using tools, a tear string 34 is interposed between the main body ply 16 and the label ply 20, directly overlying the spiral butt joint 18 of the main body ply 16 and underlying the lap joint 22 of the label ply 20. In this position, the tear string 34 follows the helix angle of the container plies and thus spirals around the body 10 for substantially its full length. At the bottom end of the container, the string 34 preferably extends into the bottom end seam 32 and is thus anchored against longitudinal movement.

The glue bond between the undersurface of the underlap of the lap joint 22 and the body ply 16 also serves to anchor the string 34. The string 34 extends upwardly in one, unbroken piece (although shown broken away in FIG. 1 to clearly illustrate its position overlying the butt joint 18) to a point adjacent the upper end seam 32 of the container, and then passes through a small hole or perforation 36 formed in the underlap portion of the label ply 20. From this point, the string 34 extends between the underlap and overlap portions of the label lap joint 22, as shown in FIGS. 1, 3 and 6. The string 34, after passing between the lapped edges of the label 20, projects externally therefrom, terminating in a free end 38 which projects or dangles from the side wall of the container and is visible to the ultimate consumer. The length of the free end 38 should be sufficient to allow easy grasping by the consumer, but should be no longer than is necessary, so as to minimize the danger of its being accidentally caught in some object and inadvertently pulled to prematurely tear through the label ply.

As seen in FIG. 4, a short separate section 40 of string extends upwardly into the upper end seam 32 from a point adjacent the perforation 36. This section 40 is merely incidental to the manufacture of the container, and serves no function in opening the container. The disclosed manner in which this section is anchored in the upper end seam is identical to that in which the lower end of the tear string 34 is anchored in the bottom end seam 32.

When the consumer desires to open the container, the free end 38 of the tear string is grasped and pulled radially outwardly, thus tearing through a portion of the label overlap to a point immediately adjacent the perforation 36 in the label underlap. Continued pulling pressure on the string 34 results in the creation of a line of tear through both the overlap and underlap of the label lap joint 22 which spirals around the body 10 from the perforation 36 to the bottom end seam 32. This line of tear is in alignment with the butt joint 18 of the main body ply 16, thereby leaving only the comparatively weak liner 12 unseparated along this spiral line.

If the pressure within the container is sufficiently great, the liner 12 will rupture and result in complete severance of the body wall. Thereafter, the consumer need only grasp both ends of the container and twist in opposite directions, thus opening up the body wall along the spiral line of tear and permitting it to be laid out flatly to expose the dough product in substantially undeformed condition. If the internal pressure does not rupture the liner, the twisting action alone is usually sufficient to do it. If not, a localized inward pressure adjacent the line of tear will initiate the rupture and permit the twisting action to be effected without difficulty.

As seen in the drawings, the label lap joint 22 is relatively wide and is positioned to overlie the butt joint 18 of the main body ply 16. The wide label overlap is glued to the underlap so that both the overlap and underlap are effective in providing reinforcement for the container in the area immediately overlying the butt joint 18 and in preventing the penetration of any moisture which might form on the label. If the label is made of aluminum foil prelaminated to a paper backing, as is preferred in this type of label, the adhesive bond between the underlap and overlap portions may be produced by a suitable hot melt adhesive which is capable of adhering to aluminum foil. This hot melt adhesive may be the same type of adhesive as is used to secure the inner label surface to the main body ply 16, or it may differ therefrom in composition. It is noted that the positioning of the tear string 34 and the wide label lap joint 22 directly over the butt joint 18 of the main body ply 16 insures that the container will be easily openable when the string is pulled through the lap joint 22, to thereby weaken the container reinforcement in the area immediately overlying the butt joint 18.

It will be readily seen that the principles of the invention are not limited to the constructions disclosed in the drawings, and various other modifications may be made in the container without departing from those principles. For example, a lining or coating comprising wax, plastic or other moisture proof material could be substituted for the inner foil liner ply 12. If desired, the butt joint 18 could be offset from the string 34 and the line of opening could be a separate weakening line, such as a cut line, score line or line of perforation, formed in the body ply 16 and disposed directly beneath the string 34. Also, the relative thickness and strength of the various body plies could be adjusted to secure various desired strength and opening characteristics. Furthermore, the term "tear string," as used herein, includes any tearing or ripping element such as a cord, wire, narrow tape or the like, which would function in substantially the same manner as the string 34.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A tear-open container having a tubular body comprising a helically wound body ply having its edges abutted in a helical line of opening, a helically wound label wrapped around said body ply and having its edges overlapped to form a lap joint positioned over said line of opening to reinforce said body in the area overlying said line of opening, and a tear string disposed directly over said line of opening and under said lap joint, said tear string extending from one end of said body to a point adjacent the other end of said body and then passing through said lap joint and terminating in a free end positioned exteriorly of said label, whereby when said free end is pulled, said string follows along said line of opening while creating a line of tear through said label lap joint in registration with said line of opening to insure opening of said container body.

2. The container of claim 1 wherein a product is provided in said tubular body and the ends of said body are closed by metal ends crimped thereto, and wherein the end of said tear string opposite its free end is clamped against longitudinal movement by one of said metal ends.

3. The container of claim 1 wherein a frangible inner lining covers the inner surface of said body ply and said helical line of opening.

4. A tear string container having a product therein and being provided with a tubular body comprising a spirally wound body ply, a pair of end members secured to the opposite ends of said body to close the same, said body ply having formed in it a line of opening extending helically around it from one of said end members to the other, a helically wound label wrapped around said body ply and having its edges overlapped to form a helically lapped joint positioned over said line of opening to reinforce said body in the area overlying said line of opening, and a tear string disposed over said line of opening and extending from one end of said body where it is secured to one of said end members to a point adjacent the other end of said body where it passes through said lapped joint and terminates in a free end positioned exteriorly of said label, whereby when said tear string is pulled a helical line is torn through said label lapped joint between said end members and in registration with said line of opening, thereby permitting further opening of the container along said line of opening by twisting the ends of the container in appropriate opposite directions.

5. The container of claim 4 wherein the line of opening in said body ply is a butt joint between lateral edges thereof.

6. The container of claim 4, wherein said label is adhesively secured to said body ply, and wherein said label lapped joint is an adhesive joint of a width sufficient to provide reinforcement for the container in the area adjacent the line of opening in said body ply.

7. A tear open container having a tubular body comprising a helically wound up body ply provided with a helical butt joint extending from one end of said body to the other, a helically wound label wrapped around said body ply and having its edges overlapped to form a lap joint positioned over said butt joint to reinforce said body in the area overlying said butt joint, said label lap joint having a wide overlap adhesively secured to the label underlap and said underlap having a perforation formed therein, and a tear string disposed directly over said butt joint and under said lap joint, said tear string extending from one end of said body to a point adjacent the other end of said body and then passing through said perforation and between said label overlap and underlap and terminating in a free end positioned exteriorly of said label, whereby when said tear string is pulled, the label is first torn along a line through said overlap to said perforation and thereafter a helical line is torn through said lap joint substantially in registration with the butt joint in said body ply.

8. The container of claim 7 wherein a product is provided in said tubular body and the ends of said body are closed by metal ends crimped thereto, and wherein the end of said tear string opposite its free end is clamped against longitudinal movement by one of said metal ends.

9. The container of claim 7 wherein a frangible inner lining covers the inner surface of said body ply and said helical butt joint.

10. A tear string container having a product therein and being provided with a tubular body comprising a spirally wound body ply, a pair of end members secured to the opposite ends of said body to close the same, said body ply having its edges abutted to form a helical butt joint extending from one of said end members to the other, a frangible inner lining covering the inner surface of said body ply and said helical butt joint, a helically wound label wrapped around said body ply and having its edges overlapped to form a lap joint positioned over said butt joint to reinforce the container in the area overlying said butt joint, said label lap joint having a wide overlap adhesively secured to the label underlap and said underlap having a perforation formed therein, and a tear string disposed directly over said butt joint and under said lap joint, said tear string secured to and extending from one of said end members to a point adjacent the other of said end members and then passing through said perforation and between said label overlap and underlap and terminating in a free end positioned exteriorly of said label, whereby when said tear string is pulled a helical line is torn through said label lap joint between said end members and in registration with the butt joint of said body ply, leaving only said frangible inner lining intact until broken readily by relatively light pressure applied thereto for releasing the product within the container.

References Cited in the file of this patent

UNITED STATES PATENTS

| | | |
|---|---|---|
| 2,795,366 | Magill | June 11, 1957 |
| 2,904,240 | Southwell | Sept. 15, 1959 |
| 3,021,047 | Pottle | Feb. 13, 1962 |
| 3,021,048 | Pottle | Feb. 13, 1962 |
| 3,042,286 | Pottle | July 3, 1962 |
| 3,051,370 | Hanlon | Aug. 28, 1962 |